(No Model.)
A. F. PRAHM.
CAR SIGNAL FLAG.
No. 579,770. Patented Mar. 30, 1897.
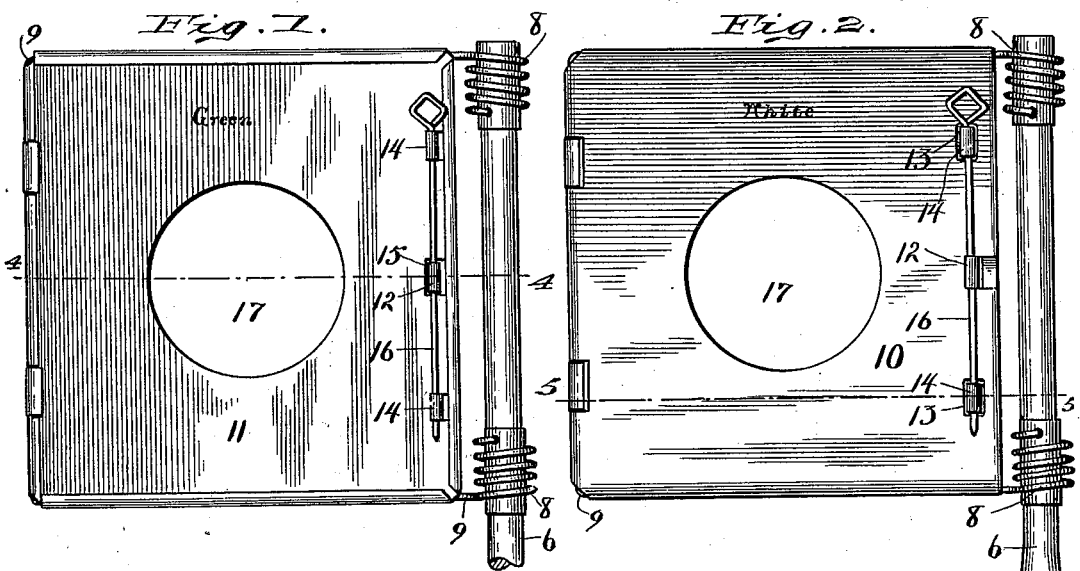
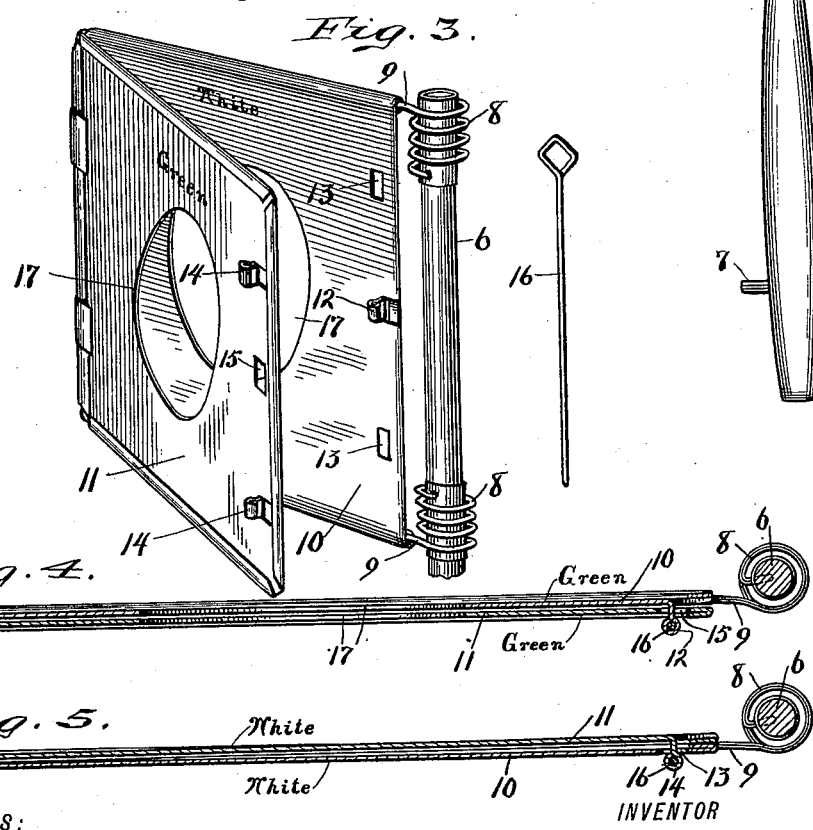
WITNESSES:
H. D. Nealy
S. C. Ellerman
INVENTOR
Adolph F. Prahm
BY
H. P. Hood & Son
ATTORNEYS

UNITED STATES PATENT OFFICE.

ADOLPH F. PRAHM, OF INDIANAPOLIS, INDIANA.

CAR SIGNAL-FLAG.

SPECIFICATION forming part of Letters Patent No. 579,770, dated March 30, 1897.

Application filed May 25, 1896. Serial No. 593,016. (No model.)

*To all whom it may concern:*

Be it known that I, ADOLPH F. PRAHM, a citizen of the United States, residing at Indianapolis, in the county of Marion and State of Indiana, have invented a new and useful Signal-Flag, of which the following is a specification.

My invention relates to an improvement in signal-flags for railway-trains.

The signal-flags in ordinary use on railway-trains are formed of cloth, which is secured to a staff similar to that shown in the drawings. While the train is standing still such a flag droops and folds upon itself until it is quite difficult for the trainmen to distinguish its color, and as soon as the train gets into motion the flag flies straight back from the staff, so that unless the observer is at one side of the train it is impossible for him to distinguish the color of the signal. Again, the flag being made of cloth it soon whips out, and separate flags for each color desired must be provided.

The object of my invention is to produce a flag which will at all times stand substantially at right angles to the direction of movement of the train, which will be durable, and the color of which may be easily and quickly changed without the necessity of substituting a separate flag.

The accompanying drawings illustrate my invention.

Figure 1 is a side elevation showing the leaves in one position. Fig. 2 is a similar elevation showing the leaves in their other position. Fig. 3 is a view in perspective, showing the two leaves of the flag slightly separated. Fig. 4 is a section on line 4 4 of Fig. 1. Fig. 5 is a section on line 5 5 of Fig. 2.

In the drawings, 6 indicates the usual flag-staff, which is provided at its lower end with a projecting pin 7, which engages a slot formed in the usual bracket secured to the engine or coach.

Secured to the upper end of staff 6 are the ends of two helical springs 8 8, said springs being formed, preferably, upon the ends of a piece of wire 9, the middle portion of which is bent to form a U-shaped frame to which is secured a covering to form the main section or leaf 10 of the flag, said covering being formed, preferably, of light sheet metal.

Pivoted or hinged to the outer edge of leaf 10, preferably upon wire 9, is a second leaf 11 of substantially the same size as leaf 10, and adapted to be swung upon its hinge so as to be brought adjacent to either face of leaf 10. The opposite faces of leaf 10 are differently colored, (white and green, for instance,) and the opposite faces of leaf 11 are similarly colored, the arrangement of the colors upon each leaf being such that with the leaf 11 in either one of its positions the exposed faces of the two leaves will be of the same color.

For the purpose of securing the two leaves together in either position of leaf 11 I provide the following construction: Projecting from one face of leaf 10 is an eye 12, and formed through said leaf, in line with eye 12, are two slots 13 13. Projecting from the opposite face of leaf 11 are two eyes 14 14, and formed through said leaf is a slot 15 in line with said eyes. The arrangement of eyes and slots is such that with the parts in the position shown in Fig. 1 eye 12 projects through slot 15 and with the parts in the position shown in Fig. 2 eyes 14 14 project through slots 13 13, eyes 12, 14, and 14 in either position of leaf 11 lying substantially in line with each other, so that they are adapted to receive pin 16.

The operation is as follows: The lower end of the staff is secured in the ordinary bracket in the usual manner, the arrangement of pin 7 being such that the flag will be held substantially at right angles to the direction of movement of the train, said pin also preventing any rotation of the staff. In case an obstruction comes into the path of the flag the said flag will swing about the staff until the obstruction is passed and will then be immediately returned to its normal position by the springs 8 8. In case it is desired to change the color of the signal the brakeman removes pin 16, swings leaf 11 upon its hinge through substantially a complete revolution, and returns pin 16 to its place in eyes 12, 14, and 14.

In order to make the color of the signal clearly distinguishable, I form in the center of each leaf an opening 17 of considerable size, said opening being generally about one fourth or fifth of the entire area of the flag. It has been found by experiment that by this means the color of the surface surrounding such an opening is much more easily distinguished because of the greater contrast between the colored surface and the light which appears both in the center of such surface and at the edges thereof.

I claim as my invention—

1. The combination of a flag, a support therefor, and a helical spring mounted upon and surrounding said support, one end of said spring secured to and supporting the flag and the other end secured to the support, substantially as described.

2. In a signal-flag, the combination with a support, of a substantially U-shaped frame upon each end of which is formed a spring the end of which is secured to said support, and a covering for said frame, said covering forming the signaling-surface, substantially as described.

3. In a signal-flag, the combination with the main leaf thereof, of a second leaf pivoted thereto and adapted to be folded upon either side of the main leaf, a support for the main leaf, and a yielding connection between said main leaf and the support whereby the flag is yieldingly held in its normal position, substantially as described.

4. In a signal-flag, the combination with the main leaf thereof, of a second leaf pivoted thereto and adapted to be folded upon either side of the main leaf, means for securing said second leaf in either of its positions, a support for the main leaf, and a yielding connection between said main leaf and the support whereby the flag is yieldingly held in its normal position, substantially as set forth.

5. In a signal-flag, the combination with a support, of a pair of helical springs mounted upon said support, said springs formed upon the ends of a U-shaped frame and the ends of said springs secured to said support, a covering for said frame, said covering constituting the main leaf of the flag, a second leaf pivoted to said main leaf and adapted to be folded upon either side thereof, and means for securing said second leaf in either of its positions, substantially as described.

6. In a signal-flag, the combination with the main leaf thereof, of a second leaf pivoted thereto and adapted to be folded upon either side of the main leaf, and means for securing said second leaf in either of its positions, said means consisting of the eyes 12 and 14, slots 13 and 15, and pin 16, substantially as described.

7. In a signal-flag, the combination with the main leaf thereof, of a second leaf pivoted thereto and adapted to be folded upon either side of the main leaf, means for securing said second leaf in either of its positions, said means consisting of eyes 12 and 14, slots 13 and 15, and pin 16, a support, and a spring secured at one end to the main leaf and at the other end to the support, substantially as described.

8. In a signal-flag, the combination with a support, of a pair of helical springs mounted upon said support, said springs formed upon the ends of a U-shaped frame and the ends of said springs secured to the support, a covering for said frame, said covering constituting the main leaf of the flag, a second leaf pivoted to said main leaf and adapted to be folded upon either side thereof, and means for securing said second leaf in either of its positions, said means consisting of the eyes 12 and 14, slots 13 and 15, and pin 16, substantially as described.

ADOLPH F. PRAHM.

Witnesses:
M. E. PRAHM,
ADDIE J. PRAHM.